(12) United States Patent
Fukano

(10) Patent No.: US 8,528,517 B2
(45) Date of Patent: Sep. 10, 2013

(54) PORTABLE WORKING MACHINE

(75) Inventor: Jun Fukano, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 420 days.

(21) Appl. No.: 12/907,600

(22) Filed: Oct. 19, 2010

(65) Prior Publication Data

US 2011/0088651 A1 Apr. 21, 2011

(30) Foreign Application Priority Data

Oct. 19, 2009 (JP) ................................ P2009-240881

(51) Int. Cl.
*F02B 77/08* (2006.01)

(52) U.S. Cl.
USPC ........... 123/198 D; 123/198 DB; 123/198 DC

(58) Field of Classification Search
USPC .......................... 123/198 D, 198 DB, 198 DC
See application file for complete search history.

(56) References Cited

U.S. PATENT DOCUMENTS

| | | | | |
|---|---|---|---|---|
| 5,033,428 A | * | 7/1991 | Sasaki | ........................ 123/198 D |
| 2002/0158754 A1 | | 10/2002 | Tabata et al. | |
| 2007/0233425 A1 | | 10/2007 | Fujiwara | |
| 2008/0254690 A1 | * | 10/2008 | Kishibata | ........................... 440/1 |

FOREIGN PATENT DOCUMENTS

| | | |
|---|---|---|
| CN | 1362923 A | 8/2002 |
| CN | 1824938 A | 8/2006 |
| CN | 101050155 A | 10/2007 |
| JP | 10-018915 | 1/1998 |
| JP | 2006-97584 A | 4/2006 |
| TW | M335683 U | 7/2008 |
| TW | M360160 U1 | 7/2009 |
| WO | WO 2007/037129 A1 | 4/2007 |

OTHER PUBLICATIONS

Office Action issued to Chinese Application No. 2010105170388, issued Oct. 31, 2012.
Office Action issued to Japanese Application No. P2009-240881, Notification of Reasons for Refusal, issued Nov. 20, 2012.

* cited by examiner

*Primary Examiner* — Noah Kamen
(74) *Attorney, Agent, or Firm* — Arent Fox LLP

(57) ABSTRACT

A portable working machine includes a gaseous-fueled engine, a working unit driven by the engine, a control unit for controlling the engine and the working unit, and an acceleration sensor capable of detecting accelerations in two mutually perpendicular horizontal directions relative to a vertical line, which is induced in the portable working machine. The control unit is configured to determine a tip angle of the portable working machine based on the horizontal accelerations detected by the acceleration sensor and issue a stop instruction to the engine when it determines that the tip angle exceeds a preset reference angle.

7 Claims, 10 Drawing Sheets

PORTABLE WORKING MACHINE

FIELD OF THE INVENTION

The present invention relates generally to a portable working machine equipped with a gaseous-fueled engine, and more particularly to a falling detection technology for detecting falling of such portable working machine.

BACKGROUND OF THE INVENTION

Working machines include portable working machines that can freely be transferred to a field site, and some kinds of such portable working machines have a working unit driven by a gaseous-fueled engine (hereinafter-referred to, for brevity, as "gas engine"). One example of such working unit is a combined gas-engine generator unit disclosed, for example, in Japanese Patent Laid-Open Publication (JP-A) No. 2006-97584.

The disclosed combined gas-engine generator unit includes a gas engine drivable by a fuel supplied from a gas cartridge, a generator driven by the gas engine, and a controller for controlling the gas engine and the generator. The gas cartridge, the gas engine, the generator and the controller are housed in a portable container or case. In use, the combined gas-engine generator unit is place on a floor and operated so that the generator is driven by the gas engine to generate electric power that can be supplied to an external appliance.

The gas engine has a lubricating system which in many cases employs a so-called "oil sump system" in which a lubricating oil held in a crankcase is distributed to sliding parts of the engine. The portable combined gas-engine generator unit is simply placed on the floor without anchoring, and hence, it may occur that the combined gas-engine generator unit falls down due to some reasons depending on installation conditions. If such falling occurs during operation of the combined gas-engine generator unit, it is desirable to stop the combine gas-engine generator unit immediately. The same situation applies to other types of portable working machines.

SUMMARY OF THE INVENTION

It is accordingly an object of the present invention to provide a portable working machine which is capable of protecting itself from damages caused due to falling of the portable working machine.

According to the present invention, there is provided a portable working machine, comprising: a gaseous-fueled engine; a working unit driven by the engine; a control unit for controlling the engine and the working unit; and an acceleration sensor capable of detecting accelerations in two mutually perpendicular horizontal directions relative to a vertical line that are induced in the portable working machine. The control unit is configured to determine a tip angle of the portable working machine based on the horizontal accelerations detected by the acceleration sensor and issue a stop instruction to the engine when it determines that the tip angle exceeds a preset reference angle.

With this arrangement, the horizontal accelerations induced in the portable working machine are detected by the acceleration sensor, and the control unit stops the engine when it determines that a tip angle of the portable working machine which is determined based on the detected horizontal accelerations exceeds a reference angle. The generator will stop as the engine is stopped. The control unit is able to conduct determination as to whether the engine is to be stopped or not before the portable working machine has fallen down. The reference angle may be set to an optimal value in view of the center of gravity, weight, size and other physical properties as well as use conditions of the portable working machine. Thus, when the portable working machine is falling during operation, the engine is stopped properly at right timing, thereby protecting the portable working machine from damage.

Preferably, the control unit is configured to issue the stop instruction when it determines that a condition in which the tip angle exceeds the reference angle continues over a preset duration time, and wherein the duration time is set to become smaller as the tip angle increases. It may occur that the portable working machine tips in one direction to a certain extent and restores its normal upright position before the preset duration time has elapsed. In this instance, the engine is allowed to continue its operation so that the working unit can continue its operation in a stable manner. Furthermore, because the duration time is set to become smaller with an increase in the tip angle of the portable working machine, the control unit is able to stop the engine at proper timing depending on tipping conditions of the portable working machine.

Preferably, the control unit is configured to, when it determines that the tip angle exceeds the reference angle, execute control in such a manner that a rotational speed of the engine is reduced to a preset reference speed. The preset reference speed is an idling speed, for example. This arrangement is particularly advantageous when the portable working machine restores its upright posture after slight tipping. While the portable working machine is in a tipped or inclined state, the engine is running at idling speed. When the upstanding posture of the working portable machine is restored, the engine is brought back to a former running condition. With this arrangement, the portable working machine can continue its operation in a stable manner.

Preferably, the acceleration sensor is a three-axis acceleration sensor, and the three-axis acceleration sensor is mounted on the portable working machine in such a manner that it can detect acceleration in a direction of gravitational force induced in the portable working machine, in addition to the horizontal accelerations. The control unit is configured to, on the basis of the acceleration in the direction of gravitational force, determine whether the portable working machine has changed its posture from a normal posture to an overturned posture, and issue the stop instruction to both the engine and the working unit immediately when it determines that the portable working machine has changed to the overturned posture.

The control unit, on the basis of the acceleration in the direction of gravity detected by the three-axis acceleration sensor, determines whether or not the portable working machine has changed its posture from the normal posture to the overturned posture. If an affirmative determination is rendered, the control unit immediately stops both the engine and the working unit, thereby bringing the portable working machine to an emergency stop.

BRIEF DESCRIPTION OF THE DRAWINGS

One preferred structural embodiment of the present invention will be described in detail below, by way of example only, with reference to the accompanying drawings, in which.

DETAILED DESCRIPTION OF THE PREFERRED EMBODIMENT

Figure 1:
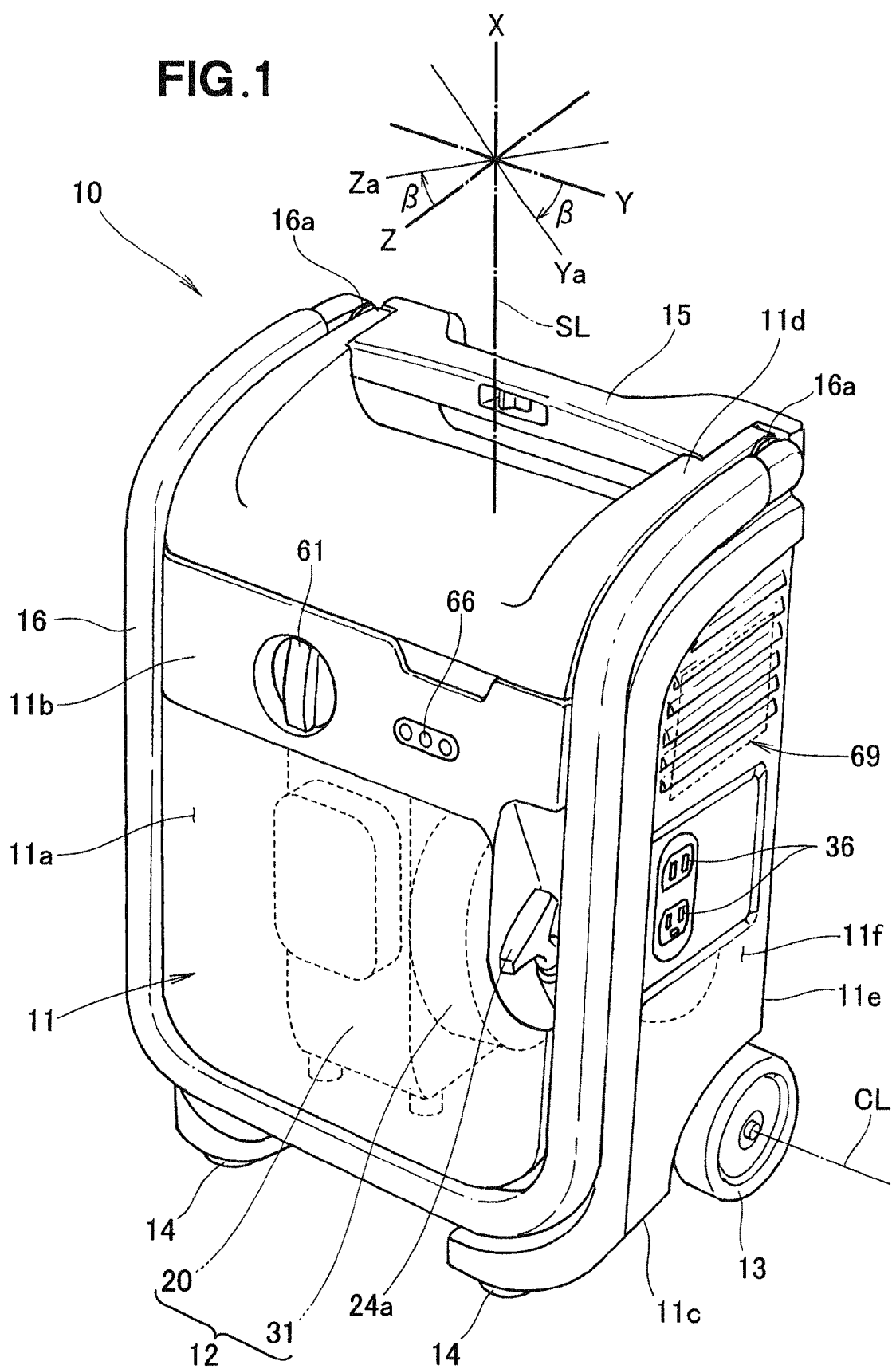
FIG. 1 is a perspective view of a portable working machine according to the present invention.

FIG. 1 shows a gas engine-driven portable generator 10 exemplifying a portable working machine according to the present invention. The portable generator 10 is shown as being in an upright position or posture. The gas engine-driven portable generator 10 is a kind of working machine, which can be carried by a human operator and can freely be transferred to a desired job site.

As shown in FIG. 1, the portable generator 10 generally includes an elongated, substantially rectangular parallelepiped container or case 11, and a combined engine-generator unit 12 housed in the case 11. The case 11 has a front panel 11a adapted to be located on a front side of the portable generator 10 while the portable generator 10 is in use, and a control section 11b provided on the front panel 11a. Parts of the portable generator 10 are oriented such that a plane including the front panel 11a forms a front face of the portable generator 10. The case 11 is provided with left and right carrier wheels 13, left and right legs 14, a grip 15, and a carrying handle 16.

The left and right wheels 13 are rotatably mounted to a bottom portion 11c of the case 11 at one side (rear side) 11e of the case 11. The left and right legs 14 are mounted to the bottom portion 11c of the case 11 at an opposite side (front side) of the case 11. By virtue of the wheels 13 and the legs 14, the portable generator 10 has a self-supporting structure and can normally remain in its upright position shown in FIG. 1.

The grip 15 is a bar-like member provided at an upper end portion 11d of the case 11. The grip 15 is disposed substantially directly above a rotation axis CL of the wheels 13 and extends parallel to the rotation axis CL.

The carrying handle 16 is pivotally mounted to the upper end portion 11d of the case 11 to undergo pivotal movement about a longitudinal axis of the bar-like grip 15. The carrying handle 16 has a generally U-shaped configuration as viewed from front elevation and an inverted L-shaped configuration as viewed from side elevation. The U-shaped carrying handle 10 has a pair of parallel spaced arms extending from pivoted base end portions 16a, 16a first in a forward direction along left and right upper edges of the case 11, then in a downward direction along left and right front edges of the case, and finally connected together at their lower ends.

Figure 2:
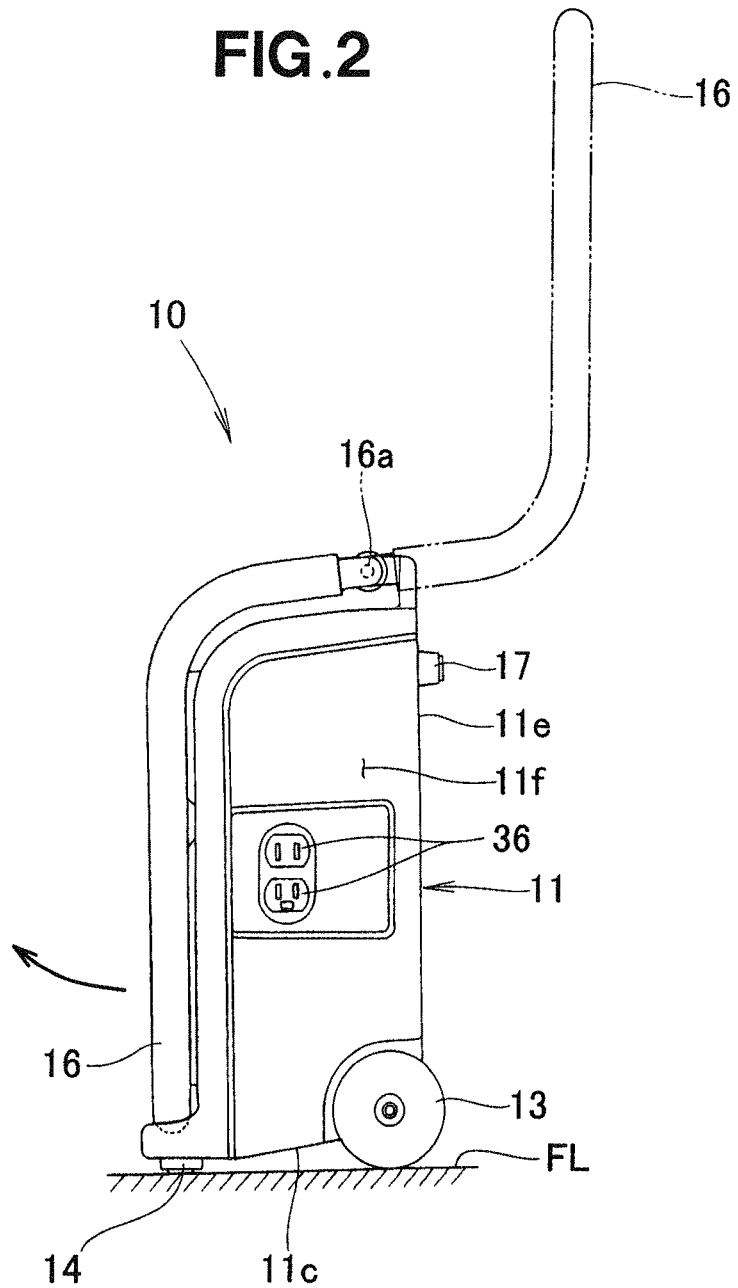
FIG. 2 is a side view of the portable working machine as it is in an upright position.

The portable gas engine-driven generator (hereinafter referred to, for brevity, as engine-driven generator") can be used in various modes, as will be described later with reference to FIGS. 2 to 5. FIG. 2 is a first mode of usage in which the engine-driven generator 10 is disposed vertically on a floor FL to assume an upright posture. In the first usage mode, the engine-driven generator 10 is self-supporting on the floor FL by means of the wheels 13 and the legs 14. While keeping the upright posture, the engine-driven generator 10 can operate the combined engine-generator unit 12 (FIG. 1). The carrying handle 16 is folded so as to lie on and along the case 1 and can be set to a raised position indicated by phantom lines in FIG. 2 as occasion arises.

Figure 3:
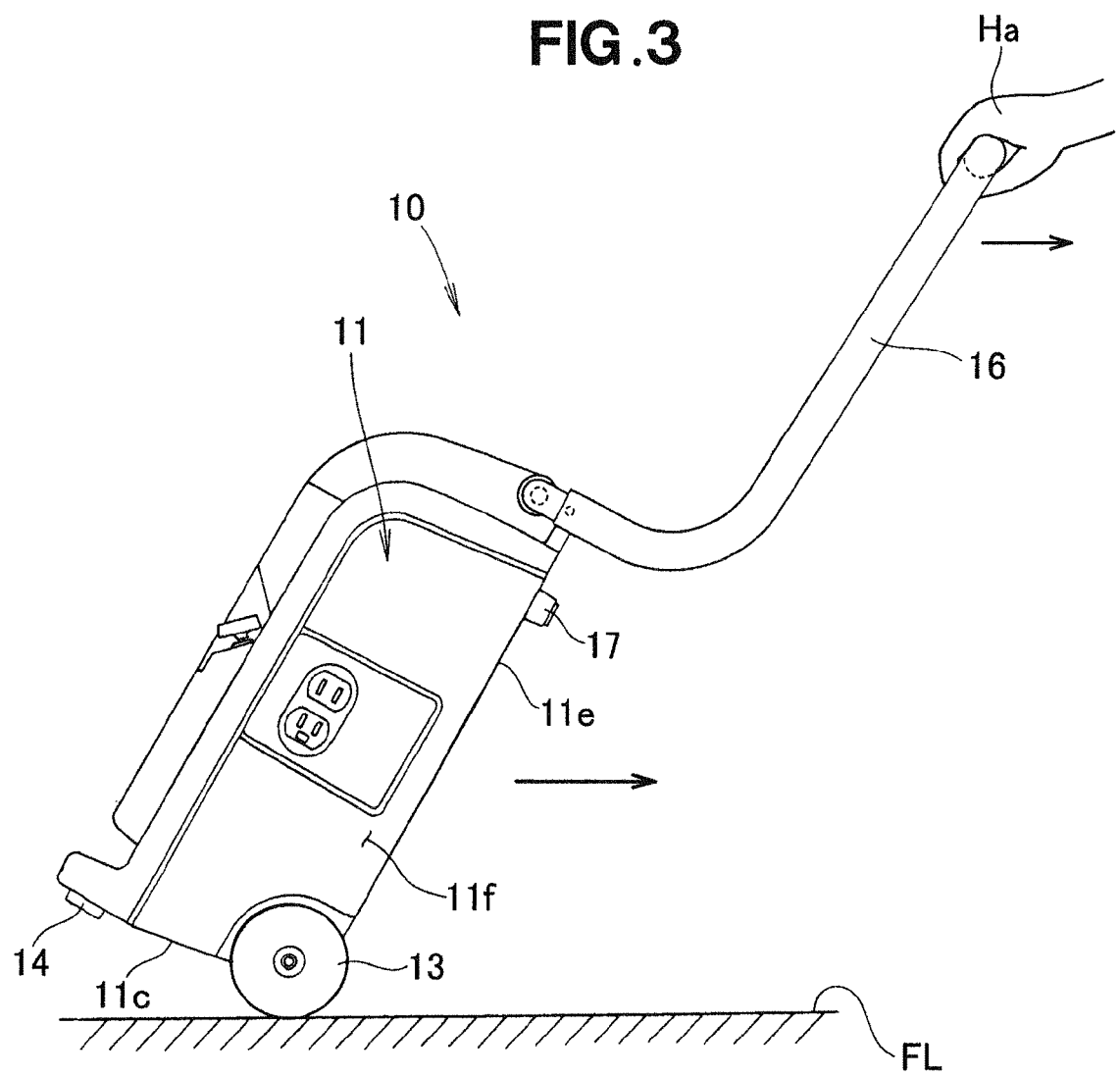
FIG. 3 is a side view illustrative of the manner in which the portable working machine is transferred.

FIG. 3 shows a second mode of usage of the engine-driven generator 10. In the second usage mode, the engine-driven generator 10 can be transferred from one place to another by pulling the carrying handle 16 with a human operator's hand Ha while the engine-driven generator 10 is inclined toward the rear side 11e and the carrying handle 16 set in the raised position. In the second usage mode, the combined engine-generator unit 12 (FIG. 1) is stopped.

Figure 4:
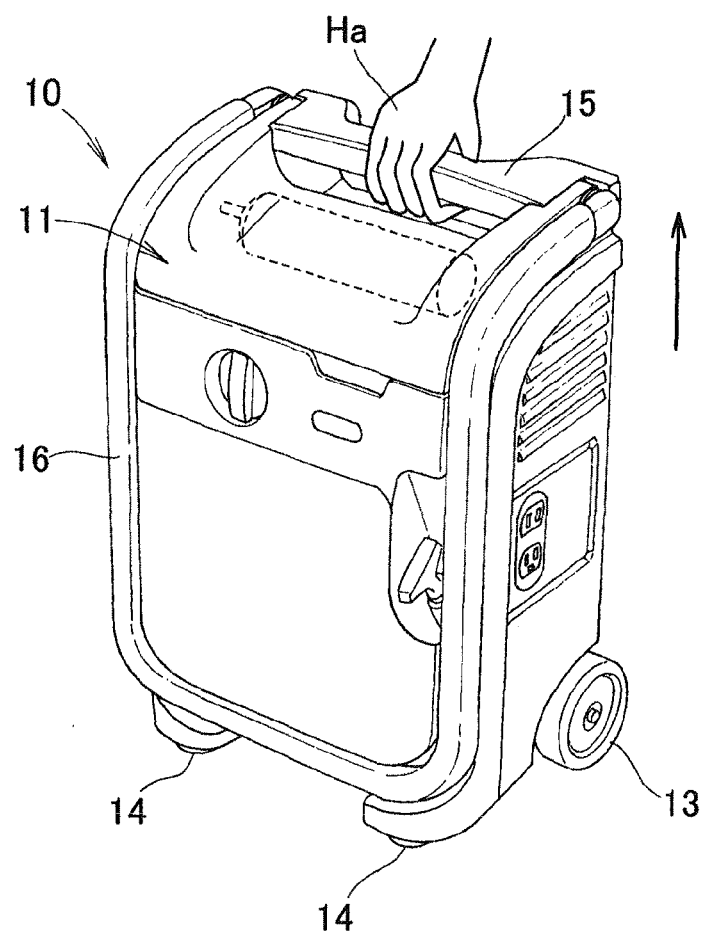
FIG. 4 is a perspective view illustrative of the manner in which the portable working machine is carried by hand.

FIG. 4 shows a third mode of usage of the engine-driven generator 10. In the third usage mode, the engine-driven generator 10 is hand-carried by the human operator while gripping the grip 15 with its hand Ha. In the third usage mode, the combined engine-generator unit 12 (FIG. 1) is stopped.

Figure 5:
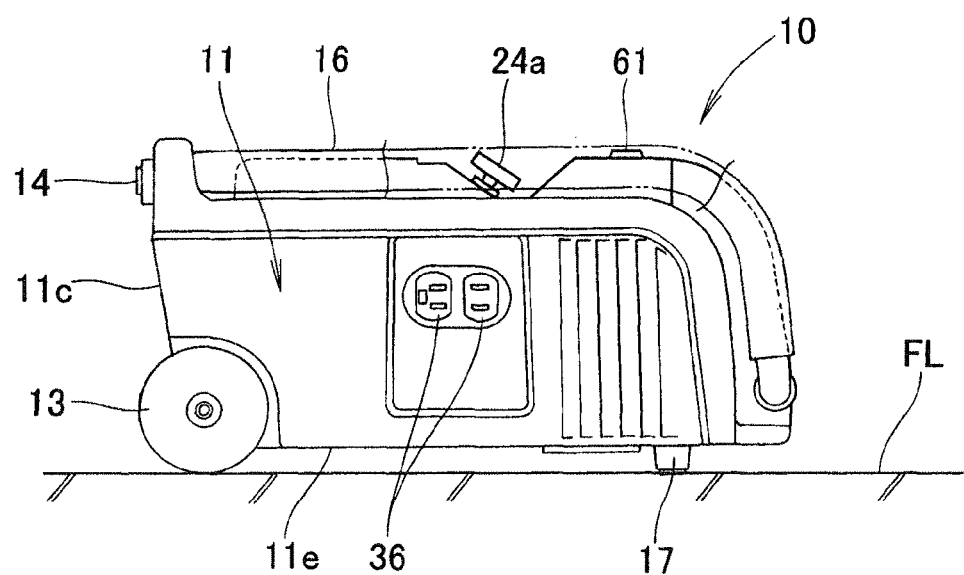
FIG. 5 is a side view of the portable working machine as it is in a recumbent position.

FIG. 5 shows a fourth mode usage of the engine-driven generator 10. In the fourth usage mode, the engine-driven generator 10 is placed on the floor FL to assume a horizontal recumbent posture. The case 11 also has left and right auxiliary legs 17 provided on the rear side 11e thereof. When the engine-driven generator 10 is laid flat on the floor FL with its front side facing upward, the wheels 13 and the auxiliary legs 17 are in contact with the floor FL and support the engine-driven generator 10 in a recumbent position. In the fourth usage mode, the combined engine-generator unit 10 (FIG. 1) is stopped. The fourth usage mode can offer a high postural stability to the engine-driven generator 10 and hence is particularly suitable for an application in which the engine-driven generator 10 is transferred by a vehicle while being held in a luggage compartment of the vehicle.

Figure 6:
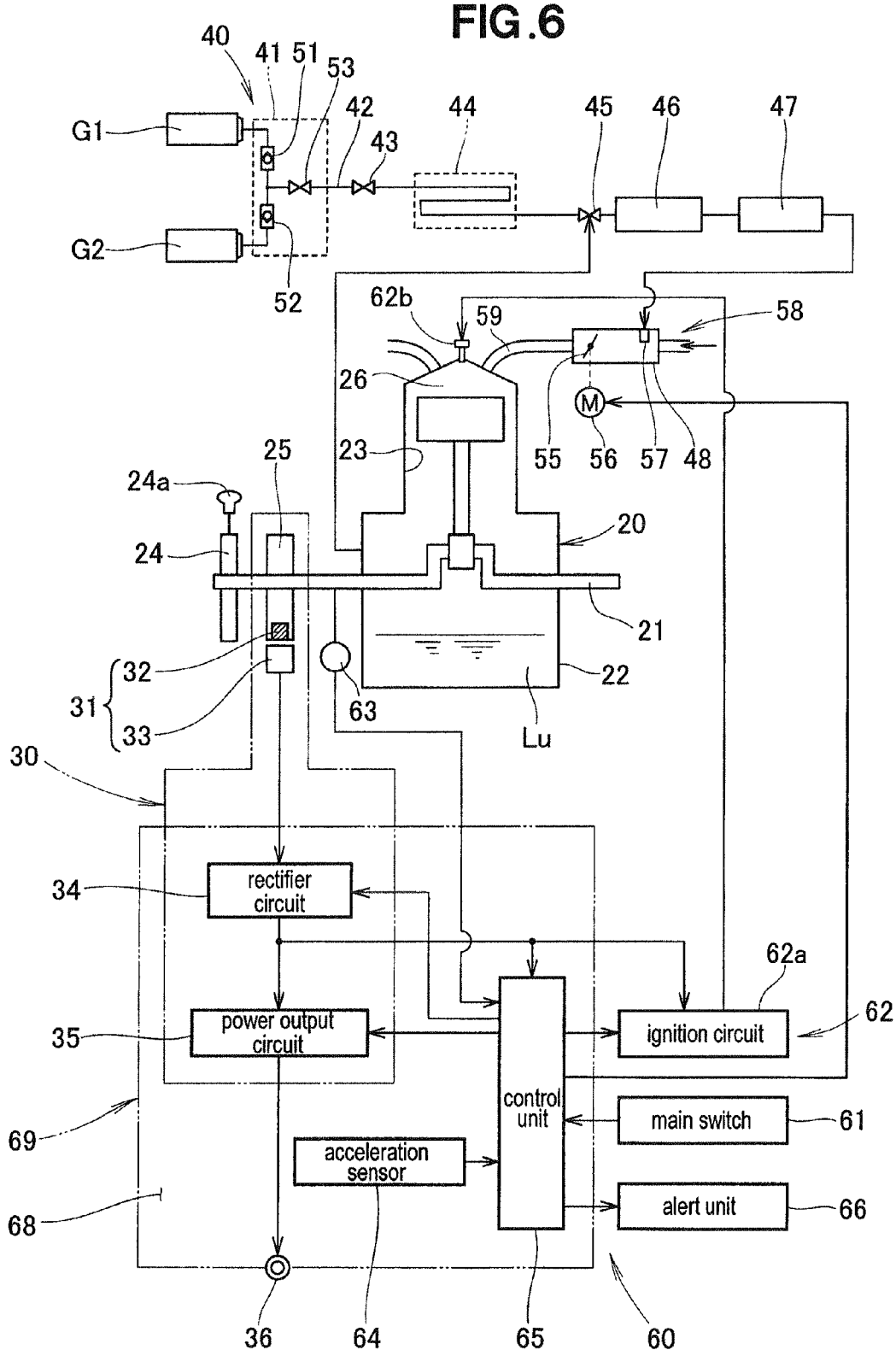
FIG. 6 is a diagrammatical view showing a general configuration of the portable working machine including a gaseous-fueled engine, a generator, a gaseous fuel supply unit, and a controller.

As shown in FIGS. 1 and 6, the combined engine-generator unit 10 (FIG. 1) is composed of a gaseous-fueled engine (i.e., gas engine) 20 and an electric generator 31 driven the gas engine 20. The gas engine 20 comprises a four-cycle single cylinder engine having a substantially horizontal crankshaft 21 and a lubricating system in which a lubricating oil Lu held in a crankcase 22 is distributed for lubrication to various sliding portions of the engine. Cylinder 23 of the gas engine 20 is disposed vertically in an upright position. The gas engine is so-called a multipurpose engine and equipped with a recoil starter 24.

The recoil starter 24 is a starting device for enabling manual starting of the gas engine 20 and provided on the crankshaft or a flywheel 25. The recoil starter 24 is able to run or rotate when a starting knob 24e is pulled by hand. The starting knob 24a is disposed on the front panel 11a of the case 11.

The generator 31 is configured to generate electric power when it is driven by the gas engine 20. The generator 31 includes a permanent magnet 32 provided on the flywheel 25 directly connected to the crankshaft 21, and a coil 33 disposed in the proximity of the flywheel 25. The electric power generated by the generator 31 is supplied via a rectifier circuit 34, an electric-power output circuit 35 and a noise filter (not shown) or the like auxiliary electric component to power supply sockets 36 (not shown) from which the electric power can be supplied to an exterior appliance. A combination of the generator 31, the rectifier circuit 34 and the electric-power output circuit 35 form a power generating working section or unit 30, which constitutes a kind of working unit driven by the gas engine 20.

The rectifier circuit 34 rectifies and converts AC (alternating-current) power into DC (direct-current) power. The electric-power output circuit 35 disposed between the rectifier circuit 34 and each of the power supply sockets 36 and formed, for example, by an FET (field-effect transistor) bridge. The DC power generated by rectification by the rectifier circuit 34 can be supplied to the outside only when the electric-power output circuit 35 is in an ON-operation state. The rectified DC power is also supplied to electric components such as an ignition device 62 and a control unit 65. The power supply sockets 36 are provided on a right side panel 11*f* of the case 11.

As shown in FIG. 6, the gaseous fuel supply unit 40 for supplying a gaseous fuel to the gas engine 20 is configured to vaporize a liquid fuel led from a pair of fuel supply sources G1 and G2 and supply the vaporized fuel to a combustion chamber 26 of the gas engine 20. The gaseous fuel supply unit 40 includes a collar retainer unit 41, a fuel supply passage 42, a hand-operated valve 43, a vaporizer 44, a cutoff valve 45, a primary regulator 46, a secondary regulator 47, and a mixer 48.

The fuel supply sources G1 and G2 comprise commercially available portable compact gas cartridges. The gas cartridges G1, G2 are filled with a liquefied fuel such as liquefied butane consisting primarily of butane.

The collar retainer unit 41 is configured to accept attachment of respective connecting collars (including gas nozzles) of the gas cartridges G1, G2 in single through one-touch operation. The collar retainer unit 41 includes two check valves 51, 52 and a single pressure detection valve 53. The check valves 51, 52 are provided to prevent backward flow of the liquefied fuel toward the gas cartridges G1, G2. The pressure detection valve 53 is closed when the pressure on a secondary side reduces to a predetermined value.

The fuel supply passage 42 is a passage for supplying the fuel from the collar retainer unit 41 to the mixer 48. The hand-operated valve 43 is a main valve formed, for example, by a cock for manually switching supply and shutoff of the fuel from the gas cartridges G1, G2. The vaporizer 44 converts the liquefied fuel (gaseous fuel) into a vaporized fuel. The shutoff valve 45 is provided to shut off the fuel supply passage 42, for example, when it is detected that the pressure inside the crankcase 22 is a negative pressure. The primary regulator 46 is a pressure regulating means for reducing (or regulating) the pressure of the gaseous fuel to a predetermined pressure. The secondary regulator (zero governor) 47 is a pressure regulating means for, after pressure reduction by the primary regulator 46, further reducing the pressure of the gaseous fuel to a value nearly equal to atmospheric pressure.

The mixer 48 mixes the gaseous fuel, which has been reduced in pressure by the secondary regulator 47, with combustion air to produce a fuel-air mixture and supplies the fuel-air mixture to the combustion chamber 26 of the gas engine 20. The mixer 48 is provided with a throttle valve 55, a control motor 56, and a fuel nozzle 57. The throttle valve 55 opens and closes an intake passage 59 of an engine intake system 58. The throttle valve 55 is operated by the control motor 56. The control motor 56 comprises a stepping motor. The fuel nozzle 57 supplies the gaseous fuel to an upstream side of the throttle valve 55.

As shown in FIG. 6, the engine-driven generator 10 is provided with a controller 60. The controller 60 consists essentially of a main switch 61, an ignition circuit 62*a* of the ignition device 62, an engine rotation sensor 63, an acceleration sensor 64, the control unit 65, and an alert unit 66.

The main switch 61 comprises a rotary switch for turning on and off (or energizing and de-energizing) a power supply system of the gas engine 20. The main switch 61 is provided on the control section 11*b* of the case 11 shown in FIG. 1. When the main switch 61 is operated to shift from an OFF position to an ON position, the controller 60 is prepared for start-up of the gas engine 20. Alternatively, when the main switch 61 is returned from the ON position to the OFF position, the controller 60 can stop operation of the gas engine 20.

The ignition circuit 62*a* ignites an ignition plug 62*b* of the ignition device 62 and for this purpose it includes an ignition coil. The ignition plug 62*b* is disposed in the combustion chamber 26. The ignition device 62 is formed, for example, by a flywheel magneto ignition device, which uses electric power generated by the generator 31 directly as primary electric power of the ignition coil without storing the electric power in a battery.

The engine rotation sensor 63 detects a rotational speed Ne of the gas engine 20 and issues a detection signal indicative of the detected rotational speed of the gas engine 20.

The acceleration sensor 64 comprises a three-axis or tri-axial acceleration sensor which is capable of detecting accelerations $\forall 1$, $\forall 2$ and $\forall 3$ (not shown) in three mutually perpendicular directions (i.e., X-axis, Y-axis and Z-axis directions). The triaxial acceleration sensor may be a general sensor such as so-called "semiconductor acceleration sensor". The semiconductor acceleration sensor has various types including a piezo-resistance type, capacitance type, and a thermo-detection type.

The acceleration sensor 64 is mounted on the engine-driven generator 10 in such a manner that the sensor 64 can detect accelerations $\forall 1$, $\forall 2$ and $\forall 3$ in three mutually perpendicular directions simultaneously that are induced in the engine-driven generator 10. For example, as shown in FIG. 1, acceleration $\forall 1$ in the direction of an X-axis represents acceleration in the direction of a vertical line SL (i.e., gravitational acceleration in a direction of gravitational force), which is induced in the portable working machine 10 itself. Similarly, acceleration $\forall 2$ in the direction of a Y-axis represents acceleration in a left-right horizontal direction induced in the portable working machine 10 itself, and acceleration $\forall 3$ in the direction of a Z-axis represents acceleration in a forward-backward horizontal direction induced in the portable working machine 10 itself. The acceleration $\forall 2$ in the Y-axis direction and the acceleration $\forall 3$ in the Z-axis direction represent accelerations in two mutually perpendicular horizontal directions relative to the vertical line SL. The acceleration $\forall 1$ in the X-axis direction, the acceleration $\forall 2$ in the Y-axis direction, and the acceleration $\forall 3$ in the Z-axis direction will sometimes be referred to, for convenience, as "longitudinal acceleration $\forall 1$", "first lateral acceleration $\forall 2$", and "second lateral acceleration $\forall 3$", respectively.

The control unit 65 is provided for controlling the gas engine 20 and the power generating working unit 30 formed, for example, by a microcomputer. More particularly, the control unit 65 is configured to receive signals from the main switch 61 and various sensors including the engine rotational sensor 63 and the acceleration sensor 64 and control the ignition circuit 62*a*, the control motor 56 for the throttle valve 55, the power output circuit 55 and the alert unit 66 according to a predetermined control mode.

For instance, the control unit 65 controls the opening of the throttle valve 65 in a predetermined control mode via the control motor 56 on the bases of data pertaining to the rotational speed Ne of the gas engine 20 as well as data pertaining to the opening of the throttle valve 55 so that the rotational speed Ne of the gas engine 20 corresponds with a target rotational speed. Furthermore, the control unit 65 also controls the rectifier circuit 34 and the electric-power output circuit 35.

The control unit 65, when it receives a detection signal from the acceleration sensor 64, performs a predetermined control mode to turn off the electric-power output circuit 35 to stop supply of electric power to the outside of the portable working machine 10 and, at the same time, stop the ignition circuit 62a to thereby stop the gas engine 20.

The alert unit 66 comprises an indicator provided on the control section 11b of the case 11 shown in FIG. 1.

The rectifier circuit 34, the electric-power output circuit 35, the acceleration sensor 64, and the control unit 65 are mounted or packaged on a single circuit board 68 and thus consolidated in a single unit 68. The single unit 69 is referred to as an electronic unit 69. The electronic unit 69 is housed in the case 11, as shown in FIG. 1. The case 11 may have a unit-mounting portion (not shown) disposed in an internal space of the case 11, and the electronic unit 69 is mounted to the unit-mounting portion. As an alternative, the electronic unit 69 may be mounted to the gas engine 20 or the generator 31.

The electronic unit 69 is arranged to ensure that accelerations ∀1, ∀2 and ∀3 in three mutually perpendicular directions induced in the portable working machine 10 itself can be accurately detected simultaneously by the acceleration sensor 64. To this end, a reference plane extending along the vertical line SL is set on a predetermined part of the engine-driven generator 10, and the electronic unit 69 is mounted to the reference plane. Thus, as shown in FIG. 1, the engine-driven generator 10 is disposed to assume an upright posture standing up along the vertical line SL, and the acceleration sensor 64 is mounted to extend along the vertical line SL. With this arrangement, it can be said that when the engine-driven generator 10 is upright along the vertical line SL, acceleration ∀1 in the X-axis direction detected by the acceleration sensor 64 represents acceleration in the direction of vertical line SL, and accelerations ∀2 and ∀3 in the Y-axis and Z-axis directions detected by the acceleration sensor 64, respectively, represent accelerations in two mutually perpendicular horizontal directions relative to the vertical line SL (also relative to a vertical axis of the engine-driven generator 10).

Since the acceleration sensor 64 and other electrical components are mounted together on the single circuit board 68 compactly and intensively, this arrangement makes it possible to accommodate many electric components efficiently in a small space within the case 11. Furthermore, electric wires interconnecting the rectifier circuit 34, the electric-power output circuit 35, the acceleration sensor 64, and the control unit 65 are not needed.

Figure 7:
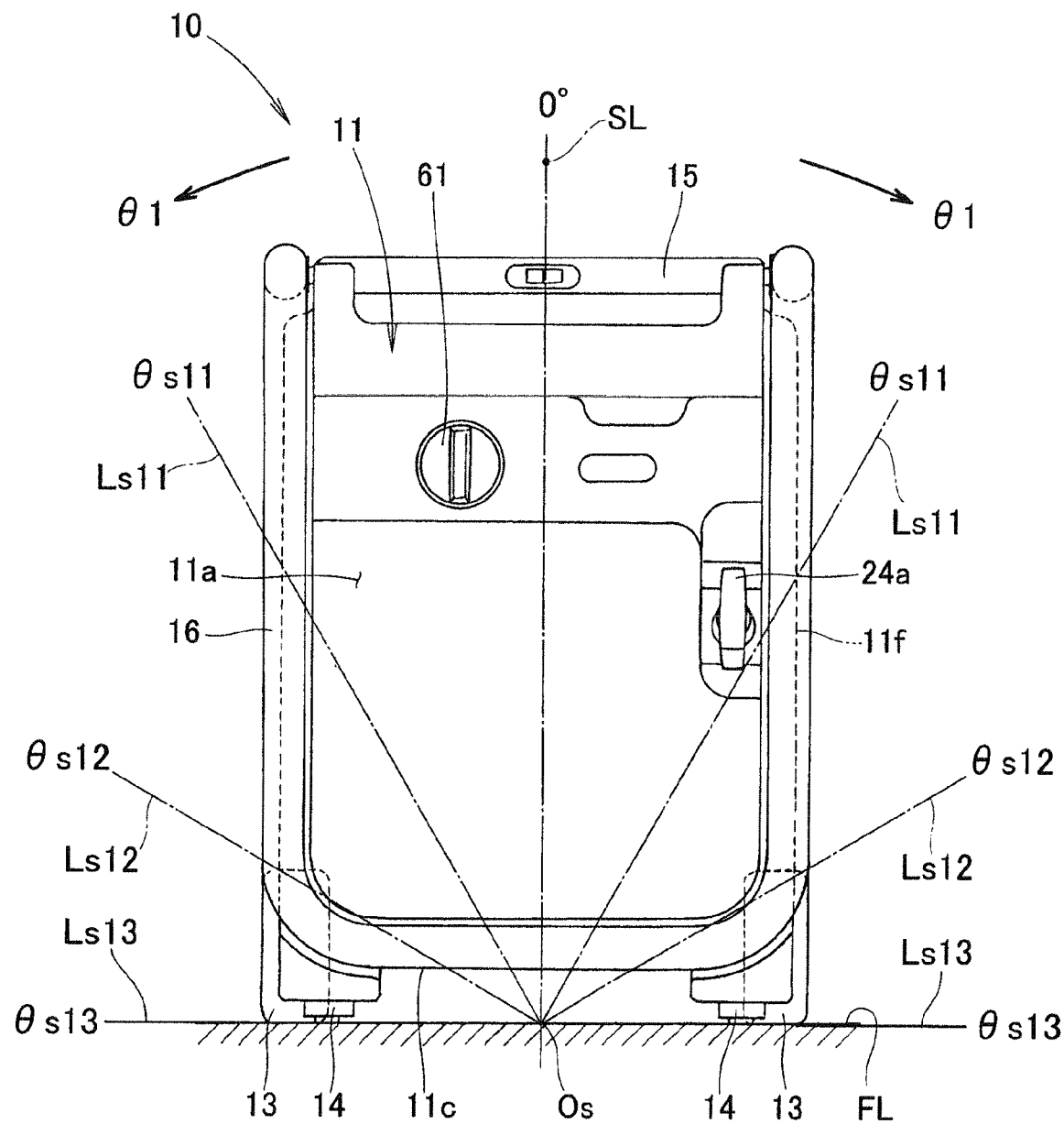
FIG. 7 is a front elevational view illustrative of reference angles when the portable working machine tilts left and right.
Figure 8:
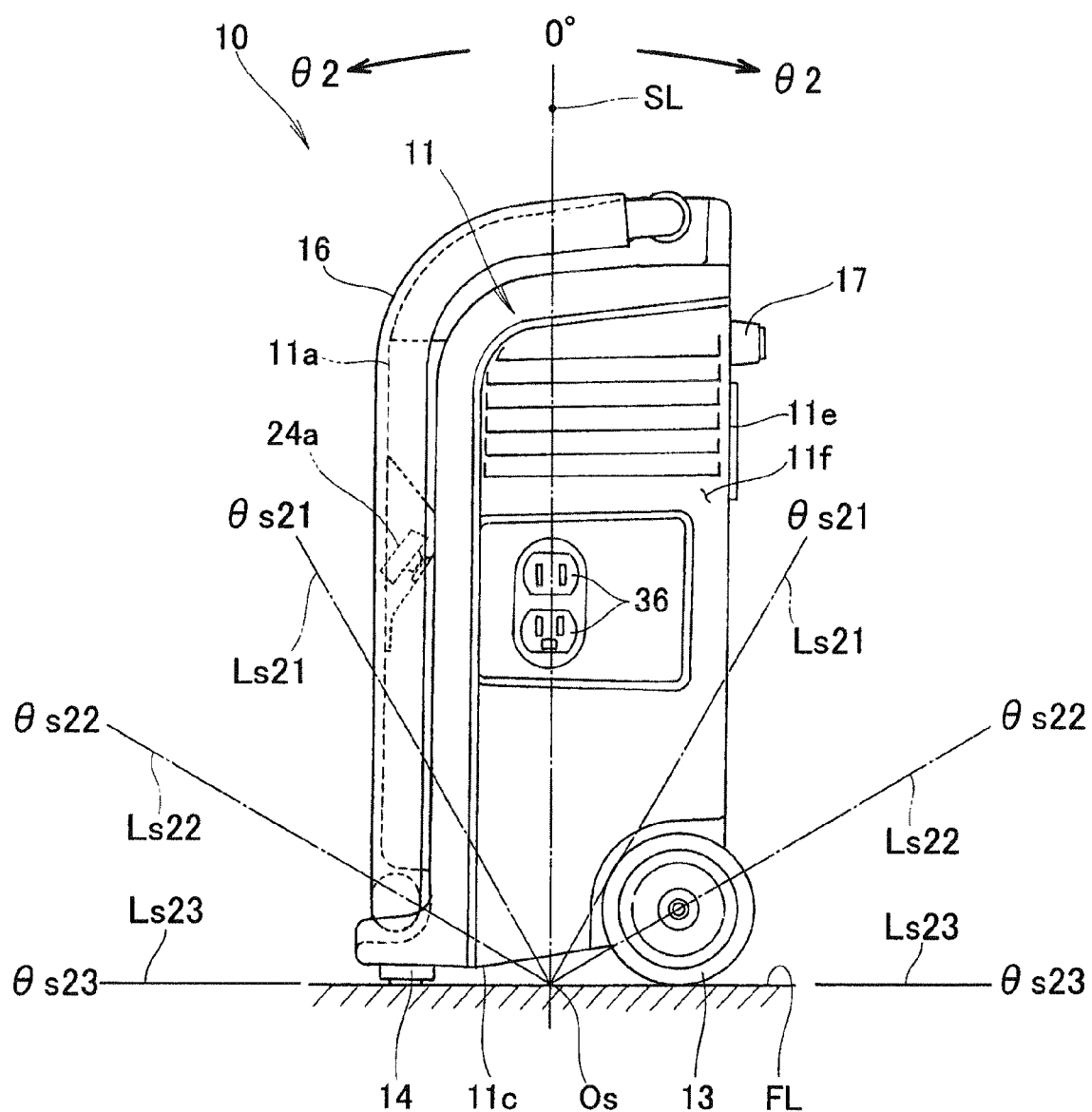
FIG. 8 is a side view illustrative of reference angles when the portable working machine tips forward and backward.

The concept of reference tip angles established when the engine-driven generator 10 falls from the upright posture will next be described with reference to FIGS. 7 and 8. FIG. 7 shows the concept of reference angles occurring when the engine-driven generator 10 tilts left and right, and FIG. 8 shows the concept of references angles occurring when the engine-driven generator 10 tilts forward and backward. The vertical line SL, which is perpendicular to the horizontal floor FL, will be hereinafter referred to as a "neutral reference line SL". Point at the intersection of the horizontal floor FL and the neutral reference line SL is a center Os, and the position of the neutral reference line SL relative to the center Os is represented by the position of an angle 0°.

As shown in FIG. 7, when the engine-driven generator 10 having upright posture is view from the front, the center in the width direction of the engine-driven generator 10 is located on the neutral reference line SL. Furthermore, when the engine-driven generator 10 is viewed from the lateral side, the center in the front-back direction of the engine-driven generator 10 is located on the neutral reference line SL. Here, it is assumed that the engine-driven generator 10 has a center of gravity located on the neutral reference line SL.

Considering that the engine-driven generator 10 tilts left or right as showing in FIG. 7, two straight lines Ls11 which are inclined slightly to the left and right from the neutral reference line SL are referred to as left and right first tipping reference lines Ls11. Each of the left and right first tipping reference lines Ls11 has a tip angle (first reference angle) $2s11$ relative to the neutral reference line SL, and the first reference angle $2s11$ is set to 30°, for example.

Similarly, when the engine-driven generator 10 further tilts left or right to a position indicated by a straight line Ls12, the straight line Ls12 is referred to as a left or right second tipping reference line Ls12. A tip angle (second reference angle) $2s12$ of the left and right second tipping reference lines Ls12 relative to the neutral reference line SL is set to be a larger value than the first reference angle $2s11$, such as 60°, for example.

When the engine-driven generator 10 further tilts left or right to a position indicated by a straight line Ls13, the straight line Ls13 is referred to as a left or right third tipping reference line Ls13. A tip angle (third reference angle) $2s13$ of the left and right third tipping reference lines Ls13 relative to the neutral reference line SL is set to be 90°, which is larger than the second reference angle) $2s12$.

When the tip angle 21 in the left-right direction of the engine-driven generator 10 is in the range of from 0° to the first reference angle $2s11$, the engine-driven generator 10 is classified as having an "upright posture". Similarly, when the tip angle 21 of the engine-driven generator 10 is in the range of from more than the first reference angle $2s11$ to the second reference angle $2s12$, the engine-driven generator 10 is classified as a "slightly tipping posture". When the tip angle 21 of the engine-driven generator 10 is in the range of from more than the second reference angle $2s12$ to the third reference angle $2s13$, the engine-driven generator 10 is classified as having a "largely tilting posture". When the tip angle 21 of the engine-driven generator 10 is equal to the third reference angle $2s13$, this means that the engine-driven generator 10 has tipped over sideways on the floor FL and is now in an overturned state.

Considering that the engine-driven generator 10 tips forward or backward as showing in FIG. 8, two straight line Ls21 which are inclined slightly to the forward and backward sides from the neutral reference line SL are referred to as forward and backward first tipping reference lines Ls21. Each of the forward and backward first tipping reference lines Ls21 has a tip angle (first reference angle) $2s21$ relative to the neutral reference line SL, and the first reference angle $2s21$ is set to 30°, for example.

Similarly, when the engine-driven generator 10 further tips forward or backward to a position indicated by a straight line Ls22, the straight line Ls22 is referred to as a forward or backward second tipping reference line Ls22. A tip angle (second reference angle) $2s22$ of the forward and backward second tipping reference lines Ls22 relative to the neutral reference line SL is set to a larger value than the first reference angle $2s21$, such as 60°, for example.

When the engine-driven generator 10 further tips forward or backward to a position indicated by a straight line Ls23, the straight line Ls23 is referred to as a forward and backward third tipping reference line Ls23. A tip angle (third reference angle) 2s23 of the forward and backward tipping reference lines Ls23 relative to the neutral reference line SL is set to be 90°, which is larger than the second reference angle) 2s22.

When the tip angle 22 of the engine-driven generator 10 is in the range of from 0° to the first reference angle 2s21, the engine-driven generator 10 is classified as having the "upright posture". Similarly, when the tip angle 22 of the engine-driven generator 10 is in the range of from more than the first reference angle 2s21 to the second reference angle 2s22, the engine-driven generator 10 is classified as having the "slightly tipping posture". When the tip angle 22 of the engine-driven generator 10 is in the range of from more than the second reference angle 2s22 to the third reference angle 2s23, the engine-driven generator 10 is classified as having the "largely tipping posture". When the tip angle 22 of the engine-driven generator 10 is equal to the third reference angle 2s23, this means that the engine-driven generator 10 has tipped over forward or backward on the floor FL and is now in the overturned state.

A control flow or routine executed by the control unit 65 (FIG. 6) constituted by a microcomputer will be described with reference to flowcharts shown in FIGS. 9 to 11.

Figure 9:
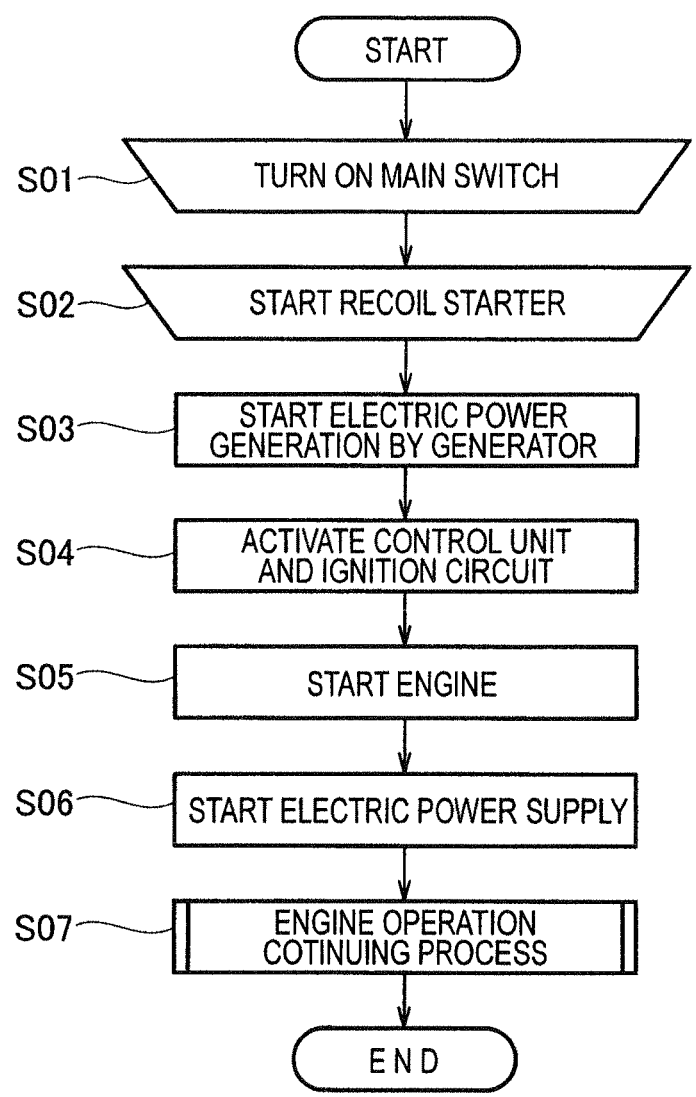
FIG. 9 is a flowchart showing a main program executed by a control unit of the control.

FIG. 9 is a flowchart showing a series of operations performed after the start-up of the gas engine 20 before the control unit 65 executes a control process. A human operator operates the hand-operated valve 43 to open and then turns on the main switch 61 (step S01). Subsequently, the operator pulls the starting knob 24a of the recoil starter 24, thereby starting up the recoil starter 24 (step S03). With this start-up operation, the crankshaft 21 of the gas engine 20 starts rotating to cause a negative pressure developed in the crankcase 22. The thus developed negative pressure is detected by the shutoff valve 45, which, upon detection of the negative pressure, opens the fuel supply passage 42. As a result, a gasification fuel is supplied into the combustion chamber 26 of the gas engine 20. On the other hand, the generator 31 is driven by the crankshaft 21, thereby starting generation of electric power (step S03).

When received electric power from the generator 31, the control unit 65 and the ignition circuit 62a are automatically activated (step S04). Thus, the control unit 65 automatically executes a predetermined engine start-up process (step S05). This means that the control unit 65 issues an ignition start command to the ignition circuit 62a whereupon high-tension electricity is applied from the ignition coil of the ignition circuit 62a to the ignition plug 62b, thereby igniting the gasification fuel supplied in the combustion chamber 26. Thus, the gas engine 20 starts to run.

Thereafter, a predetermined control mode is performed to electrically control the engine speed such that a rotational speed of the gas engine 20 corresponds with a target rotational speed. When the rotational speed of the gas engine is in a stable state, the control unit 65 issues a power-output start command to the power generating working unit 30 (step S06). This means that the electric-power output circuit 35 is turned on or activated. The thus activated electric-power output circuit 35 starts supplying electric power generated from the generator 31. Then, the control unit 65 executes a predetermined engine operation continuing process (step S07). A control flow for executing the engine operation continuing process will be described with reference to the flowcharts shown in FIGS. 10 and 11.

Figure 10:
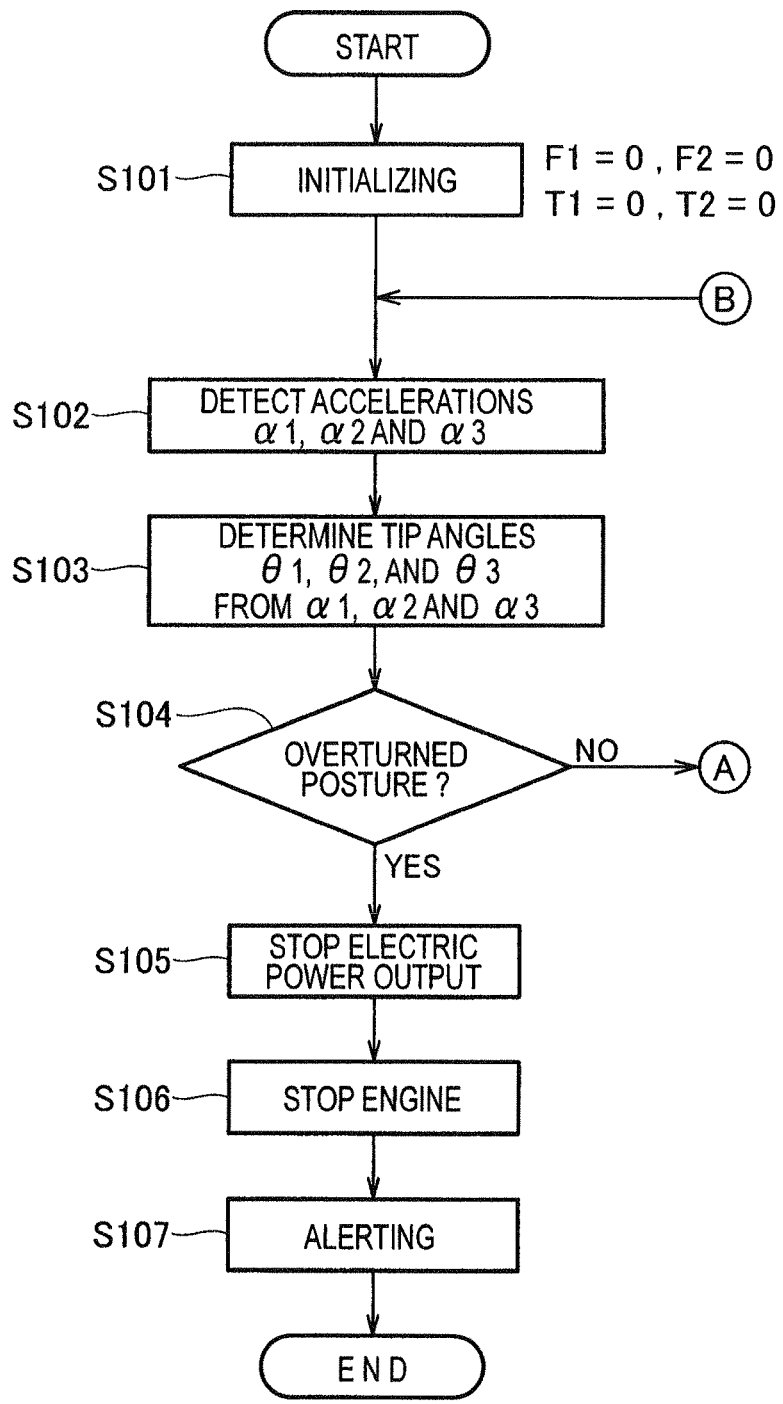
FIG. 10 is a flowchart showing a subroutine executed by the control unit.
Figure 11:
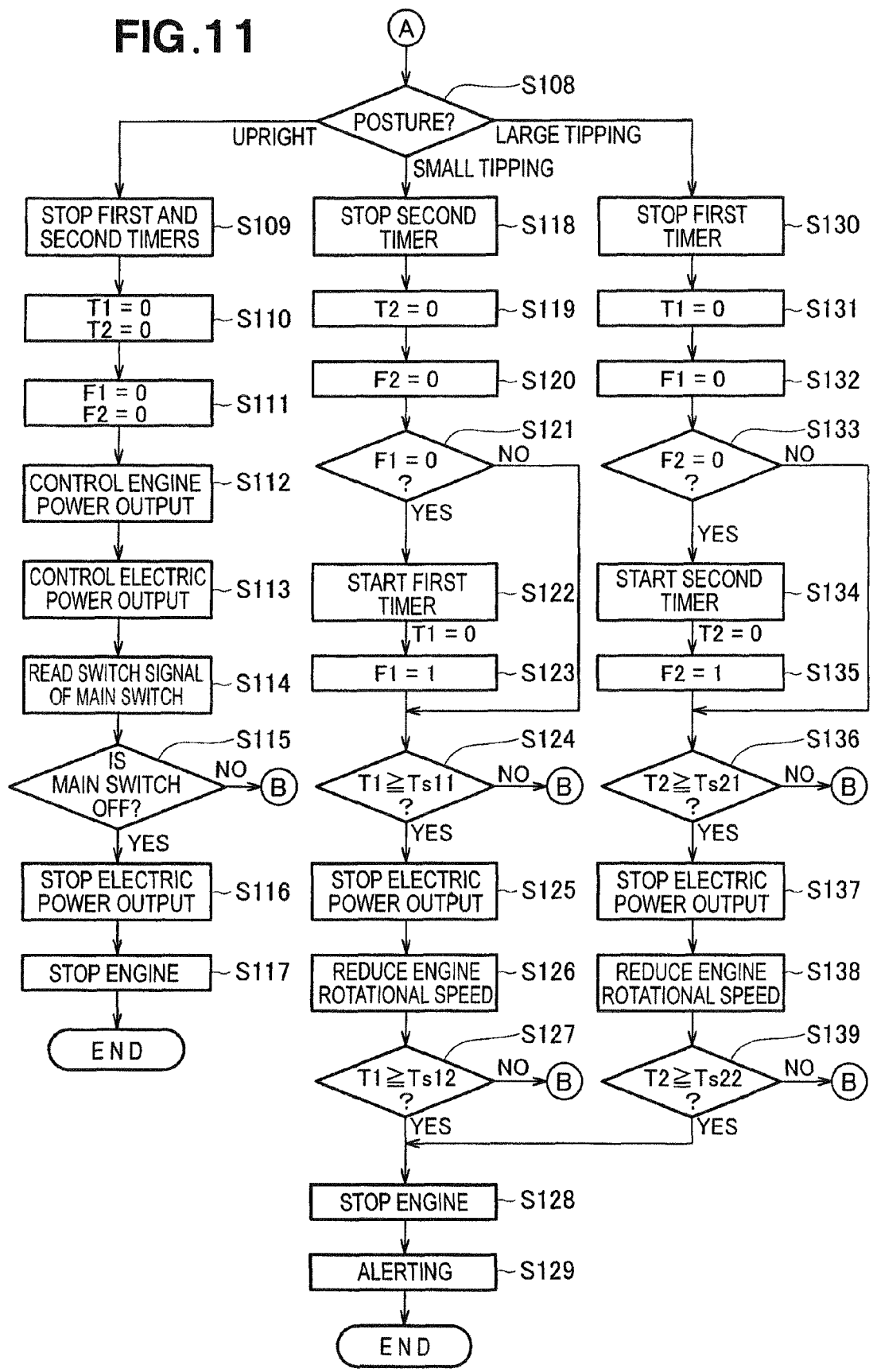
FIG. 11 is a flowchart showing subroutines executed by the control unit depending on different postures of the portable working machine.

FIGS. 10 and 11 subroutines according to which the control unit 65 executes the engine operation continuing process at step S07 shown in FIG. 9. As shown in FIG. 10, the control unit 65 first executes initialization at step S101. More particularly, a first flag F1 for start/stop determination of a first timer is set to "0" (the first timer is stopped), a second flag F2 for start/stop determination of a second timer is set to "0" (the second timer is stopped), a count time T1 of the first timer is set to "0", and a count time T2 of the second timer is set to "0".

Subsequently, the control unit 65 reads accelerations ∀1, ∀2 and ∀3 along X-, Y- and Z-axis simultaneously that are detected by the acceleration sensor 64 (step S102). Then, based on the triaxial accelerations ∀1, ∀2 and ∀3, tip angles 21, 22 and 23 of the engine-driven generator 10 are determined (step S103). More specifically, based on the longitudinal acceleration ∀1, a tip angle 21 of the engine-driven generator 10 in the direction of gravitational force is determined. Similarly, the first lateral acceleration ∀2 is used to determine a tip angle 22 of the engine-driven generator in the left-right horizontal direction of the engine-driven generator 10. Based on the second lateral acceleration ∀3, a tip angle 23 of the engine-driven generator 10 in the forward-backward horizontal direction of the engine-driven generator 10 is determined.

In this instance, a proper arithmetic expression or a map is used in order to determine the tip angles 21-23 are determined based on the accelerations ∀1-∀3, When the map is used, correlation data about tip angles 21-23 and accelerations ∀1-∀3 are set in advance and stored in a memory of the control unit 65.

Subsequently, the control unit 65 determines whether or not the engine-driven generator 10 has changed its posture from the normal posture (upright posture) shown in FIG. 7 to the overturned posture (step S104). In this instance, if the tip angle 21 in the direction of gravitational force is approximately −180°, it is determined that the posture of the engine-driven generator 10 has changed to the overturned posture. When determination is affirmative (i.e., overturning has taken place), the control unit 65 immediately issues a stop instruction to both the gas engine 20 and the power-generating working unit 30 (steps S105-S106).

More specifically, at step S105, the control unit 65 issues an electric-power output stop instruction (turn-off instruction) to the electric power output circuit 35. As a result, the electric-power output circuit 35 is turned off, thereby stopping supply of electric power generated by the generator 31.

Furthermore, at step S106, the control unit 65 stops the gas engine 20 by issuing a stop instruction to the ignition circuit 62a, for example. By thus issuing the stop instruction, the high-tension electricity applied from the ignition coil of the ignition circuit 62a to the ignition plug 62b disappears and the gas engine 20 stops operation. This causes the crankshaft 21 to stop rotation, and the internal pressure of the crankcase 22 returns to ordinary pressure. The shutoff valve 45 detects the ordinary pressure inside the crankcase 22 and shuts off the fuel supply passage 42.

Subsequently, at step S107 the control unit 65 activates the alert unit 66 and, thereafter, terminates the control process. The alert unit 66 may have a flashlight indicator that can flicker to report a stop of the engine-driven generator 10 caused due to overturning of the engine-driven generator 10.

If determination at step S104 indicates that the engine-driven generator 10 maintains the normal posture (upright posture), the control process proceeds to step S108 shown in FIG. 11. Step S108 determines if the current posture of the engine-driven generator 10 corresponds to any of the upstanding posture, the slightly tipping posture, and the largely tipped posture.

In this instance, if first and second conditions are satisfied, it is determined that the engine-driven generator 10 currently has an "upstanding posture". The first condition is that the tip angle 21 in the left-right direction of the engine-driven generator 10 is in the range of from 0° to the first reference angle 2s11 (0≦θ1≦θs11) as shown in FIG. 7, and the second condition is that the tip angle 22 in the forward-backward direction of the engine-driven generator 10 is in the range of from 0° to the first reference angle 2s21 (0≦θ2≦θs21) as shown in FIG. 8.

Alternatively, if third and fourth conditions are satisfied, it is determined that the engine-driven generator 10 currently has a "slightly tipping posture". The third condition is that the tip angle 21 in the left-right direction of the engine-driven generator 10 is in the range of from more than the first reference angle 2s11 to the second reference angle 2s12 (θs11<θ1≦θs12) as shown in FIG. 7, and the fourth condition is that the tip angle 22 in the forward-backward direction of the engine-driven generator 10 is in the range of from more than the first reference angle 2s21 to the second reference angle 2s22 (θs21<θ2≦θs22) as shown in FIG. 8.

Alternatively, if fifth and sixth conditions are satisfied, it is determined that the engine-driven generator 10 currently has a "largely tipping posture". The fifth condition is that the tip angle 21 in the left-right direction of the engine-driven generator 10 is in the range of from more than the second reference angle 2s12 to the third reference angle 2s13 (θs12<θ1≦θs13) as shown in FIG. 7, and the sixth condition is that the tip angle 22 in the forward-backward direction of the engine-driven generator 10 is in the range of from more than the second reference angle 2s22 to the third reference angle 2s23 (θs22<θ2≦θs23) as shown in FIG. 8.

As described above, the first to sixth conditions that are used to define reference angles involve respective ranges of angle.

If determination at step S108 indicates that the engine-driven generator 10 has an "upright posture", this means that both the first condition (0≦θ1≦θs11) and the second condition (0≦θ2≦θs21) are satisfied, and the control process proceeds to step S109. At step S109, the first and second timers are stopped or held in a stopped state. Subsequently, the count time T1 of the first timer and the count time of the second timer are reset to "0" (step S110). Then, the first and second flags F1 and F2 are reset to "0" (step S111).

Subsequently, normal engine power output control prepared an engine-driven generator 10 having an "upright posture" is executed (step S112). Stated more specifically, in a predetermined control mode, control is performed such that the rotational speed Ne of the gas engine 20 corresponds with a first target rotational speed Ns1. The first target rotational speed Ns1 is set to be about 5000 to about 6000 rpm. Specifically, the control motor 56 is controlled to regulate the opening of the throttle valve 55, thereby controlling the rotational speed Ne of the gas engine 20.

Next, normal electric-power output control for an engine-driven generator 10 having an "upright position" is executed (step S113). Stated more specifically, an on-operation instruction is issued to the electric-power output circuit 35 to turn on or activate the latter. Thus, while the engine-driven generator 10 is in the "upright posture", electric power generated by the generator 31 can be supplied from the power supply sockets 36 to the outside of the engine-driven generator 10.

Subsequently, a switch signal of the main switch 61 is read (step S111). Then, it is determined whether the switch signal of the main switch 61 is OFF (S115). If determination at step S115 indicates that the switch signal of the main switch 61 is still in the ON state, the control process returns to step S102 shown in FIG. 10 and operation of the engine-driven generator 10 continues further.

Alternatively, if determination at step S115 is affirmative, this means that the switch signal of the main switch 61 is determined to be in the OFF state, and a turn-off-instruction is issued to the electric-power output circuit 35 (step S116). As a result, the electric-power output circuit 35 is turned off or deactivated whereby electric power generated by the generator 31 is not supplied to the outside any more.

Subsequently, the gas engine 20 is stopped at step S117, and the control process is terminated. At step S117, the control unit 65 issues a stop instruction to the ignition circuit 62a, for example, whereupon the high-tension electricity applied from the ignition coil of the ignition circuit 62a to the ignition plug 62b disappears and the gas engine 20 is stopped. This causes the crankshaft 21 to stop rotation, and the internal pressure of the crankcase 22 returns to ordinary pressure. The shutoff valve 45 detects the ordinary pressure developed inside the crankcase 22 and shuts off the fuel supply passage 42.

If determination at step S108 indicates that the engine-driven generator 10 has a "slightly tipping posture", this means that at least one of the third condition (θs11<θ1≦θs12) and the fourth condition (θs21<θ2≦θs22) is satisfied, and the control process proceeds to step S118.

At step S118, the second timer is stopped or held in a stopped state. Subsequently, the count time T2 of the second timer is reset to "0" (step S119). Then, the second flag F2 is reset to "0" (step S120).

Subsequently, it is determined whether the first flag F1 for start/stop determination of the first timer is "0" or not (step S121). If an affirmative determination is rendered (F1=0), the count time T1 of the first timer is reset to "0" and subsequently the first timer is started (step S122). Then, the first flag F1 is inverted or set to "1" (step S123) and the control process advances to step S124. Alternatively, if determination at step S121 is negative (F1=1), this means that the first timer has already been started, and the control process jumps to step S124.

Step S124 determines whether the count time T1 of the first timer is equal to or greater than a preset first reference time Ts11. If a negative determination is rendered (T1<Ts11), the control process returns to step S102 and operation of the engine-driven generator 10 continues further.

Alternatively, if determination at step S124 is affirmative (T1≧Ts11), a turn-off instruction is issued to the electric-power output circuit 35 (step S125). As a result, the electric-power output circuit 35 is turned off or deactivated whereby electric power generated by the generator 31 is not supplied to the outside any more.

Subsequently, the gas engine 20 is controlled such that the rotational speed Ne of the gas engine 20 is reduced to a second target rotational speed (second reference speed) Ns2 (step S126). The second target rotational speed Ns2 is preferably set to be equal to a speed under lo-load condition, i.e., an idling speed, which is about 2000 to about 4000 rpm. More specifically, the control motor 56 is controlled to reduce the opening of the throttle valve 55, thereby reducing the rotational speed Ne of the gas engine 20.

Then, it is determined whether the count time T1 of the first timer is equal to or greater than a preset second reference time Ts12 (step S127). The second reference time Ts12 is set to a larger value than a value of the first reference time Ts11. If determination at step S127 is negative (T1<Ts12), the control process returns to step S102 and operation of the engine-driven generator 10 continues further.

Alternatively, if an affirmative determination is rendered (T1≧Ts12) at step S127, the gas engine 20 is stopped (step S128). More specifically, a stop instruction is issued to the ignition circuit 62a, for example, whereupon the high-tension electricity applied from the ignition coil of the ignition circuit 62a to the ignition plug 62b disappears and the gas engine 20 is stopped. This causes the crankshaft 21 to stop rotation, and the internal pressure of the crankcase 22 returns to ordinary pressure. The shutoff valve 45 detects the ordinary pressure developed inside the crankcase 22 and shuts off the fuel supply passage 42. Subsequently, the alert unit 66 is operated (step S129) and, thereafter, the control process is terminated. The alert unit 66 may have another flashlight indicator that can flicker to report a stop of the engine-driven generator 10 caused due tipping to a slightly tipping position.

As thus far described, according to steps S108-S128, the control unit 65 issues a turn-off instruction to the electric-power output circuit 35 when it determines that a condition in which the tip angle 21 or 22 exceeds a reference angle $2s11$ or $2s21$ (that is realized when at least one of the third condition ($\theta s11 < \theta 1 \leq \theta s12$) and the fourth condition ($\theta s21 < \theta 2 \leq \theta s22$) is satisfied) continues over the first reference time (first duration time) Ts11 and further issues a stop instruction to the gas engine 20 when it determines that the same condition continues over the second reference time (second duration time) Ts12.

If determination at step S108 indicates that the engine-driven generator 10 has a "largely tipping posture", this means that the tip angle 21 or 22 of the engine-driven generator 10 exceeds a second reference angle $2s12$ or $2s22$ (as realized when at least one of the fifth condition ($\theta s12 < \theta 1 \leq \theta s13$) and the sixth condition ($\theta s22 < \theta 2 \leq \theta s23$) is satisfied), and the control process proceeds to step S130.

At step S130, the first timer is stopped or held in a stopped state. Subsequently, the count time T1 of the first timer is reset to "0" (step S131). Then, the first flag F1 is reset to "0" (step S132).

Subsequently, it is determined whether the second flag F2 for start/stop determination of the second timer is "0" or not (step S133). If an affirmative determination is rendered (F2=0), the count time T2 of the second timer is reset to "0" and subsequently the second timer is started (step S134). Then, the second flag F2 is inverted or set to "1" (step S135) and the control process advances to step S136. Alternatively, if determination at step S133 is negative (F2=1), this means that the second timer has already been started, and the control process jumps to step S136.

Step S136 determines whether the count time T2 of the second timer is equal to or greater than a preset first reference time Ts21. If a negative determination is rendered (T2<Ts21), the control process returns to step S102 and operation of the engine-driven generator 10 continues further. The first reference time Ts21, which is employed when the engine-driven generator 10 has a "largely tipping posture", is set to a smaller value than a value of the first reference time Ts11 employed when the engine-driven generator 10 has a "slightly tipping posture" (Ts21<Ts11).

Alternatively, if determination at step S136 is affirmative (T2≧Ts21), a turn-off instruction is issued to the electric-power output circuit 35 (step S137). As a result, the electric-power output circuit 35 is turned off or deactivated whereby electric power generated by the generator 31 is not supplied to the outside any more.

Subsequently, the gas engine 20 is controlled such that the rotational speed Ne of the gas engine 20 is reduced to a third target rotational speed (third reference speed) Ns3 (step S138). The third target rotational speed Ns3 is preferably set to be equal to the idling speed, which is about 2000 to about 4000 rpm. More specifically, the control motor 56 is controlled to reduce the opening of the throttle valve 55, thereby reducing the rotational speed Ne of the gas engine 20.

Then, it is determined whether the count time T2 of the second timer is equal to or greater than a preset second reference time Ts22 (step S139). If a negative determination is rendered (T2<Ts22), the control process returns to step S102 and operation of the engine-driven generator 10 continues further. The second reference time Ts22 is set to a larger value than a value of the first reference time Ts21. The value of the second reference time Ts22, which is employed when the engine-driven generator 10 has a "largely tipping posture", is made greater than the value of the first reference time Ts11, which is used at step S124 when the engine-driven generator 10 has a "slightly tipping posture" (Ts21<Ts22<Ts11<Ts12).

Alternatively, if determination at step S139 is affirmative (T2≧Ts22), the control process proceeds to step S128 where the gas engine 20 is stopped. Subsequently, the alert unit 66 is operated (step S129) and, thereafter, the control process is terminated. The alert unit 66 may have still another flashlight indicator that can flicker to report a stop of the engine-driven generator 10 caused due to tipping to a largely tipping position.

As thus far described, according to steps S108, S130-S139,-S128 and S129, the control unit 65 issues a turn-off instruction to the electric-power output circuit 35 when it determines that a condition in which the tip angle 21 or 22 exceeds a reference angle $2s12$ or $2s22$ (that is realized when at least one of the fifth condition ($\theta s12 < \theta 1 \leq \theta s13$) and the sixth condition ($\theta s22 < \theta 2 \leq \theta s23$) is satisfied) continues over the first reference time (first duration time) Ts21 and further issues a stop instruction to the gas engine 20 when it determines that the same condition continues over the second reference time (second duration time) Ts22.

It can readily be appreciated from the foregoing description that in the illustrated embodiment, accelerations ∀2 and ∀3 in two mutually perpendicular horizontal directions that are induced in the portable engine-driven generator (portable working machine) 10 are detected by the acceleration sensor 64 (step S102 shown in FIG. 10). The control unit 65 stops operation of the gas engine 20 when it determines that a tip angle 21 or 22 of the engine-driven generator 10, which is determined based on detected information ∀2, ∀3, exceeds a first reference angle $2s11$ or $2s12$ (determination of "small tipping" at step S108 shown in FIG. 11) or a second reference angle $2s21$ or $2s22$ (determination of "large tipping" at step S108).

As a result, the generator 31 (power generating working unit 30) driven by the gas engine 20 is stopped. Thus, before the engine-driven generator 10 falls down, the control unit 65 is able of determine whether or not the gas engine 20 is to be stopped. The reference angles may be set to optimum values in consideration of the center of gravity, weight, size and other physical properties as well as service condition of the engine-driven generator 10. When the engine-driven generator 10 is falling down during operation, the gas engine 20 is stopped promptly and properly, thereby providing sufficient protection to the engine-driven generator 10 against damage.

Furthermore, the control unit 65 is configured to stop the gas engine 20 (step S128) when it determines that a condition in which the tip angle 21 or 22 exceeds a preset reference angle (determination of "small tipping" or determination of "large tipping" at step S108) continues over the duration time Ts12, Ts22 (step S127 or S139). It may occur that the engine-driven generator 10 tips to a certain extent and restores its normal upright posture before the duration time Ts12, Ts22 has elapsed. In this instance, operation of the gas engine 20 is continued (steps S112 and S113), whereby the generator 31 (power-generating working unit 30) is driven continuously in a stable manner.

The duration times Ts12, Ts22 are set to become smaller as the tip angle 21, 22 of the engine-driven generator 10 increases. More specifically, if determination at step S108 indicates that the engine-driven generator 10 has a "slightly tipping posture", step S139 is executed. Alternatively, if determination at S108 indicates that the engine-driven generator 10 has a "largely tipping posture", step S139 is executed. With this control process, it is possible to stop the gas engine 20 at the right time according to the current tipping state of the engine-driven generator 10.

The control unit 65, when it determines that the tip angle 21, 22 of the engine-driven generator 10 exceeds a reference value (determination of "small tipping" or determination of "large tipping" at step S108), execute control such that a rotational speed Ne of the gas engine 20 is reduced to a reference speed Ns1, Ns2 (steps S126 and S138). It may occur that the engine-driven generator 10 first tips to a certain extent and then restores its normal upright position before the duration time Ts12, Ts22 has elapsed. If such tipping of the engine-driven generator 10 occurs (determination of "small tipping" or determination of "large tipping" at step S108), the gas engine 20 is controlled to run at reduced rotational speeds. Thereafter, the control unit 56 determines that the engine-driven generator 10 restores its normal upright posture (determination of "upright" at step S108) whereupon the gas engine 20 is brought back to its former operating state (steps S109 to S112). This arrangement enables the engine-driven generator 10 to continue its running in a stable manner.

Furthermore, on the basis of acceleration $\forall 1$ in the direction of gravitational force that is detected by the acceleration sensor 64 consisting of a three-axis or triaxial acceleration sensor (step S102), the control unit 65 determines whether the engine-driven generator 10 has changed its posture from the upright posture to an overturned posture (steps S103-S104). In use, the engine-driven generator 10 is not anchored to the floor FL and, accordingly, it may occur that the engine-driven generator 10 tips over or overturns due to some reasons depending on installation conditions and surroundings. To avoid this problem from happening, the control unit 65 issues a stop instruction to both the gas engine 20 and the power-generating working unit 30 (steps S105-S106) immediately after it has determined that the posture of the engine-driven generator 10 has changed to the overturned posture (step S104). An emergent stop of the engine-driven generator 10 can thus be performed.

Furthermore, because the accelerator sensor 64 is formed by a three-axis or triaxial acceleration sensor, it is possible to detect tip angles of the engine-driven generator 10 in all directions by using such single triaxial accelerator. Additionally, by using the single acceleration sensor 64 and the other electric components 34, 35 and 65 in combination, plural processes, such as stopping of the gas engine 20 and control of the engine rotational speed Ne, can be executed simultaneously.

The above-mentioned first to sixth conditions provided for defining the reference angle each involve a certain angular range within which the reference angle can be varied. For small tip angles 21, 22 of the engine-driven generator 10, the duration time before engine stopping is set to be relatively long as compared to a relatively short duration time which is set for large tip angles 21, 22 of the engine-driven generator 10. The same applies to the setting of the rotational speed Ne of the gas engine 20. The portable working machine 10 is used in various manners depending on the type, usage and service condition of the working machine 10. The present invention is able to offer high merchantability when embodied in such portable working machines which are in many cases used with small tip angles.

According to the present invention, the portable working machine should by no means be limited to the engine-driven portable generator as in the illustrated embodiment but may include various portable working machines such as a tiller, bush-cutter, portable pump, and portable blower.

The acceleration sensor 64 formed by a triaxial acceleration sensor is mounted on the engine-driven generator 10 in such a manner that the acceleration sensor 64 can detect accelerations $\forall 2$ and $\forall 3$ in two mutually perpendicular horizontal directions which are perpendicular to the vertical line SL. As shown in FIG. 1, the Y-axis and Z-axis may be displaced in a horizontal direction by a predetermine angle β, so that the Y-axis and Z-axis assume the positions denoted by Ya and Za, respectively.

Assuming that one of the detected horizontal accelerations $\forall 2$ and $\forall 3$ involves an error due to malfunction of the acceleration sensor 64, the control unit 65 is then modified such that it first determines that which acceleration $\forall 2$ or $\forall 3$ involves an error and subsequently determine tip angles 21 and 22 of the engine-driven generator 10 by calculation using only one of the $\forall 2$ and $\forall 3$ which is determined as being free from error. With this modification, it is possible to obtain accurate tip angles $\forall 2$ and $\forall 3$ rapidly at all times regardless of the malfunction of the acceleration sensor 64.

It is preferable that each of the parameters including the reference times (duration times) Ts11, Ts12, Ts21 and Ts22, reference angles 2s11-2s13 and 2s21-2s23, target rotational speeds (reference speeds) Ns1-Ns3 is set to be an optimal value depending on the type, usage and service condition of the portable working machine. In determining the optimal value, a suitable hand-operated adjusting means may be provided on the portable working machine 10.

The arrangement used to stop operation of the gas engine 20 is not limited to an arrangement to stop the ignition device 62 but may include another arrangement in which the shutoff valve 45 is closed. In the latter case, the shutoff valve 65 is substituted by an electric valve, such as an electromagnetic valve, that can be opened and closed by a signal issued from the control unit 65.

With the arrangements so far described, the invention can be used advantageously as a portable working machine such as a gas engine-driven portable generator including a generator driven by a multipurpose gas engine.

Obviously, various minor changes and modifications of the present invention are possible in light of the above teaching. It is therefore to be understood that within the scope of the appended claims the invention may be practiced otherwise than as specifically described.

What is claimed is:

1. A portable working machine, comprising:
    a gaseous-fueled engine;
    a working unit driven by the engine;
    a control unit for controlling the engine and the working unit;
    an acceleration sensor capable of detecting accelerations in two mutually perpendicular horizontal directions relative to a vertical line that are induced in the portable working machine; and
    a case adapted to accommodate the engine, the working unit and the control unit, the case comprising wheels and a carrying handle,
    wherein the control unit is configured to determine a tip angle of the portable working machine based on the horizontal accelerations detected by the acceleration sensor and issue a stop instruction to the engine when it determines that the tip angle exceeds a preset reference angle.

2. The portable working machine according to claim 1, wherein the acceleration sensor is a three-axis acceleration sensor, and the three-axis acceleration sensor is mounted on the portable working machine in such a manner that it can detect acceleration in a direction of gravitational force induced in the portable working machine, in addition to the horizontal accelerations, and wherein the control unit is configured to, on the basis of the acceleration in the direction of gravitational force, determine whether the portable working machine has changed its posture from a normal posture to an overturned posture, and issue the stop instruction to both the engine and the working unit immediately when it determines that the portable working machine has changed to the overturned posture.

3. The portable working machine of claim 1, wherein the working unit comprises a generator, a rectifier circuit and an electric-power output circuit.

4. The portable working machine of claim 1, wherein the control unit is configured to issue the stop instruction to reduce a rotational speed of the engine to a preset reference speed when the control unit determines the tip angle exceeds the preset reference angle.

5. The portable working machine of claim 4, wherein the preset reference speed is an idling speed.

6. A portable working machine, comprising:
a gaseous-fueled engine;
a working unit driven by the engine;
a control unit for controlling the engine and the working unit; and
an acceleration sensor capable of detecting accelerations in two mutually perpendicular horizontal directions relative to a vertical line that are induced in the portable working machine,
wherein the control unit is configured to determine a tip angle of the portable working machine based on the horizontal accelerations detected by the acceleration sensor and issue a stop instruction to the engine when it determines that the tip angle exceeds a preset reference angle, and
wherein the control unit is configured to issue the stop instruction when it determines that a condition in which the tip angle exceeds the reference angle continues over a preset duration time, and wherein the duration time is set to become smaller as the tip angle increases.

7. The portable working machine according to claim 6, wherein the control unit is configured to, when it determines that the tip angle exceeds the reference angle, execute control in such a manner that a rotational speed of the engine is reduced to a preset reference speed.

* * * * *